(12) United States Patent
Howell et al.

(10) Patent No.: US 8,974,587 B2
(45) Date of Patent: Mar. 10, 2015

(54) CASTING SAND CORE COMPOSITION

(75) Inventors: Drew Howell, Anna, OH (US); Timothy Hider, Minster, OH (US); Richard Niekamp, New Breman, OH (US)

(73) Assignee: Honda Motor Co., Ltd., Tokyo (JP)

( * ) Notice: Subject to any disclaimer, the term of this patent is extended or adjusted under 35 U.S.C. 154(b) by 525 days.

(21) Appl. No.: 13/296,103

(22) Filed: Nov. 14, 2011

(65) Prior Publication Data

US 2012/0118200 A1     May 17, 2012

Related U.S. Application Data

(60) Provisional application No. 61/413,909, filed on Nov. 15, 2010.

(51) Int. Cl.
| | | |
|---|---|---|
| C09C 1/28 | (2006.01) | |
| C04B 14/06 | (2006.01) | |
| C04B 28/00 | (2006.01) | |
| C04B 111/00 | (2006.01) | |

(52) U.S. Cl.
CPC .............. C04B 28/00 (2013.01); C04B 14/06 (2013.01); *C04B 2111/00939* (2013.01)
USPC ...................................................... 106/38.2

(58) Field of Classification Search
CPC ............ C04B 14/06; B22C 1/00; B22C 1/16; B22C 9/00
See application file for complete search history.

(56) References Cited

U.S. PATENT DOCUMENTS

| | | | | |
|---|---|---|---|---|
| 3,679,703 A | * | 7/1972 | Conrady et al. .............. | 523/139 |
| 3,756,309 A | | 9/1973 | Nishiyama et al. | |
| 3,887,677 A | * | 6/1975 | Deuter ........................ | 264/272.2 |
| 3,898,090 A | * | 8/1975 | Clark ............................ | 106/38.2 |
| 4,236,568 A | * | 12/1980 | Larson ........................ | 164/527 |
| 4,460,032 A | * | 7/1984 | Lund ............................ | 164/195 |
| 4,724,892 A | | 2/1988 | Schneider et al. | |
| 4,840,219 A | | 6/1989 | Foreman | |
| 4,904,423 A | | 2/1990 | Foreman et al. | |
| 5,238,976 A | | 8/1993 | Iyer | |
| 5,612,393 A | | 3/1997 | Arakawa et al. | |
| 7,000,680 B2 | | 2/2006 | Kurokawa et al. | |
| 7,281,570 B2 | | 10/2007 | Koch et al. | |
| 7,673,668 B2 | | 3/2010 | Sakaguchi et al. | |
| 2008/0314549 A1 | | 12/2008 | Gerlach et al. | |
| 2009/0199992 A1 | * | 8/2009 | Trinowski et al. .............. | 164/16 |

FOREIGN PATENT DOCUMENTS

| | | |
|---|---|---|
| JP | 58-32540 A | 2/1983 |
| JP | 63-177941 A | 7/1988 |
| JP | 10-328780 A | 12/1998 |

OTHER PUBLICATIONS

Strobl, S.M. et al., Gauging Green Sand Flowability Helps Predict Mold Quality, Modern Casting, Feb. 1997, pp. 48-50.
Strobl, S.M. et al., Using Stress-Strain Curves to Evaluate and Control Clay Bonded Molding Sands, 4th Asian Foundry Congress Transactions, Oct. 1996, pp. 1-10.

* cited by examiner

*Primary Examiner* — Pegah Parvini
(74) *Attorney, Agent, or Firm* — Standley Law Group LLP

(57) ABSTRACT

A casting process sand core composition including sand particles (grains) and a binder material. Both substantially spherical sand grains and substantially non-spherical grains may be present. The size of the sand grains is preferably held within a preselected and controlled range, and the size distribution by weight percentage of the sand grains within the grain size range is also controlled. The present invention also contemplates methods of making a sand core from such a composition, and methods of making a casting with a die that uses a sand core made from such a composition.

19 Claims, 2 Drawing Sheets

U S 8,974,587 B2

CASTING SAND CORE COMPOSITION

This application claims the benefit of U.S. Provisional Application No. 61/413,909 filed on Nov. 15, 2010, which is hereby incorporated by reference in its entirety.

TECHNICAL FIELD

The present invention is directed to a sand composition for use in making a sand core (i.e., to a sand core composition), and to a method of making a sand core and a sand core casting. The present invention is also directed to a sand core composition, such as for use in a die casting process, wherein the size distribution of sand particles in the composition is controlled to provide sand stability in the sand core, and to a method of making a sand core and a cast part using a sand core comprised of such a composition.

BACKGROUND

A sand core is used for forming internal cavities in a cast item, such as a die cast item. For example, a sand core is typically inserted between two halves of a casting die prior to introduction of a molten metal into the die. After solidification of the metal, the die halves are separated and the cast item is removed. Subsequently, the sand core is broken apart and removed from the cast item. By such a process, a cast item may be produced with internal cavities of desired size and shape.

Currently, many vehicle manufacturers use die casting and/or other casting processes to produce vehicle components—such as vehicle engine parts. In order to produce cast vehicle components, a sand core is frequently employed as described above. These sand cores are commonly molded from a mixture of silica sand grains and a resin binder for coating and binding the silica sand grains. Silica sand contains $SiO_2$ as a main component thereof.

It has been determined that the type of sand used to make a sand core can affect the maximum density of the sand core. The type of sand may also affect the fluidity/flowability of the composition used to make the sand core. For example, the density of a sand core and fluidity/flowability of a sand core composition may be affected by the shape of the sand grains (e.g., spherical, mixed spherical and non-spherical, etc.) These factors, individually or collectively, may result in a weak sand core. A weak sand core may be broken during its removal from a sand core forming mold and/or during an associated metal casting process. If a core breaks during a metal casting process, problems such as, for example, veining in the cast product may occur.

Consequently, it can be understood that there is a need for a sand core composition having sufficient fluidity to permit the precise and repeatable molding of sand cores of desired size and shape, which sand core composition will also result in sand cores of sufficient strength to withstand the pressures of an associated casting process. Exemplary sand core compositions of the present invention satisfy these needs/preferences.

SUMMARY OF THE GENERAL INVENTIVE CONCEPT

Exemplary embodiments of the present invention are directed to sand core compositions that exhibit good fluidity/flowability. Exemplary embodiments of such sand core compositions are also capable of producing sand cores of sufficient strength to withstand the temperatures and pressures of associated casting processes (e.g., aluminum die casting).

Exemplary embodiments of sand core compositions of the present invention include both sand particles and a binder material. As would be well known to one of skill in the art, a selected binder material is intermixed with the sand to coat the sand particles, thereby facilitating the binding together thereof.

The sand of a sand core composition of the present invention may include a mixture of both spherical and non-spherical sand grains such as, for example, silica sand grains and lake sand grains. Silica sand is known in the art to have grains of a substantially spherical shape, while lake sand is known in the art to have grains of substantially non-spherical (e.g., polygonal or angular) shape. In addition to containing multiple sand types, the sand particles present in a sand core composition of the present invention preferably also have a particularly selected grain size range (e.g., between about 30 mesh and about 200 mesh). Further, the grain size distribution within this range is focused primarily around preselected mesh grain sizes so as to be representable by a bell curve having a peak that occurs at about a desired mesh size.

As a result, a sand core composition of the present invention may exhibit increased fluidity (i.e., such a sand core composition is better able to completely fill an associated sand core mold). Additionally, sand cores formed from a sand core composition of the present invention are believed to exhibit increased strength in comparison to sand cores molded from a sand and resin composition wherein the grain size distribution of the sand is not controlled, or not controlled in the manner described herein. Sand core compositions of the present invention have been found useful for molding, for example, sand cores for producing water passages in cast vehicle cylinder heads.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Exemplary embodiments of improved casting sand core compositions according to the present invention are described below. As will be clarified hereinafter, exemplary embodiments of sand core compositions of the present invention may exhibit increased composition fluidity or flowability in comparison to known sand core compositions employing dissimilar sand types or known sand core compositions with dissimilar sand particle size distributions. In addition, sand cores made with the exemplary sand core compositions of the present invention may also have increased stability and resistance to fracture (e.g., strength) over sand cores made with only silica sand and a binder material or made with a similar sand/binder mixture but a different sand particle size distribution.

Figure 1:
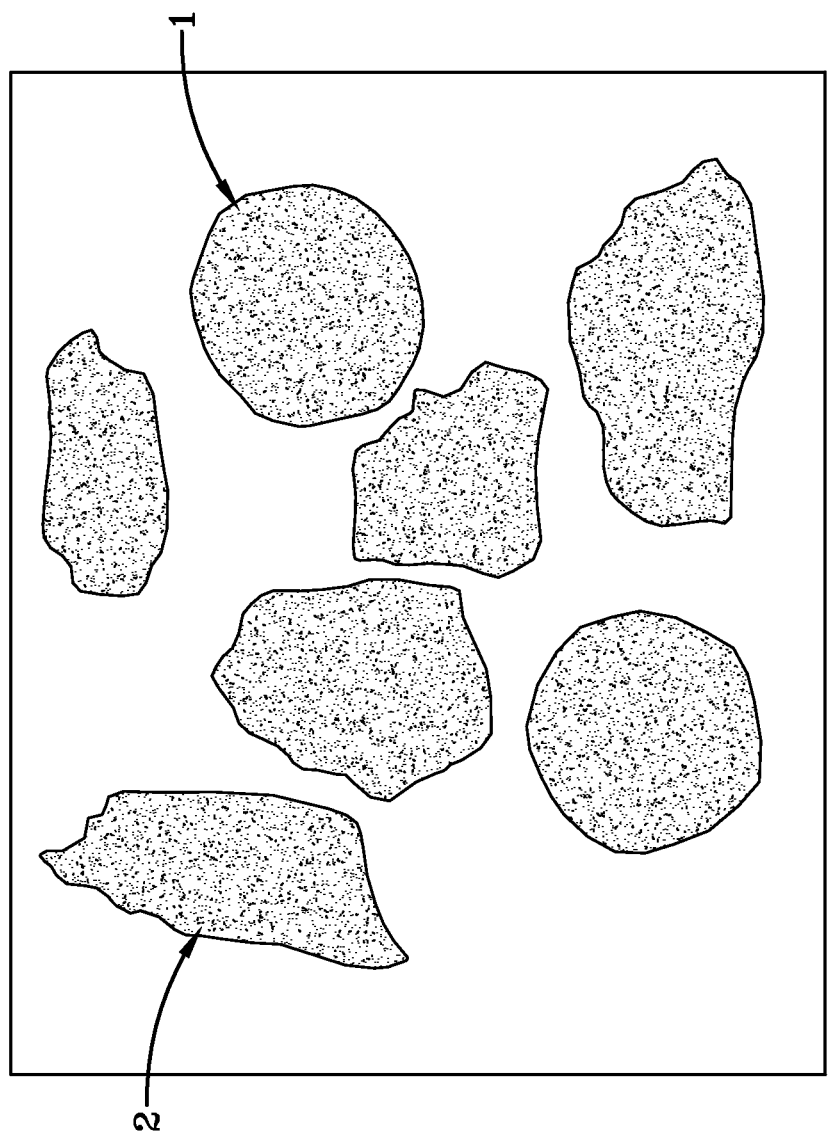
FIG. 1 is a magnified view of the sand particles of an exemplary embodiment of a casting sand core composition of the present invention, identifying both silica sand particles and lake sand particles.

As illustrated in FIG. 1, exemplary sand core compositions according to the present invention include sand particles (or grains) and a binder material. For example, FIG. 1 illustrates a sand core composition according to the present invention that includes sand grains having both substantially spherical and substantially non-spherical shapes. In this particular embodiment, the substantially spherical sand grains are silica sand grains 1 ("silica sand") and the substantially non-spherical sand grains are lake sand grains 2 ("lake sand"). The silica sand 1 is primarily beach sand and may also include grains that are somewhat oval in shape. Lake sand 2 is primarily deep sand and may be, for example, substantially polygonal or angular in cross-sectional shape.

In this exemplary sand core composition, silica sand 1 preferably comprises about 40% to about 60% of the total sand particles present. Likewise, lake sand 2 preferably comprises about 40% to about 60% of the total sand particles present in the sand core composition. More preferably, the sand content of this exemplary sand core composition is about 60% silica sand 1 and about 40% lake sand 2.

The sand particles of a sand core composition according to the present invention preferably have a particular and controlled range of grain sizes. For example, in the exemplary composition discussed with respect to FIG. 1, the silica sand 1 and lake sand 2 are present in grain sizes ranging from about 30 mesh to about 200 mesh and, more particularly, in grain sizes of 30, 40, 50, 70, 100, 140, and 200 mesh. The corresponding micron sizes for various mesh sizes are shown below in Table 1.

TABLE 1

| U.S. Series equivalent No. | Tyler screen scale sieves, meshes per lin in. | Openings, mm | Openings, in., ratio √2, or 1.414 | Permissible variations in avg opening % ± | Diam wire, decimal of an in. | Mesh openings, microns |
|---|---|---|---|---|---|---|
| 4 | 4 | 4.699 | 0.187 | 3 | 0.065 | 4760 |
| 6 | 6 | 3.327 | 0.132 | 3 | 0.036 | 3327 |
| 8 | 8 | 2.362 | 0.0937 | 3 | 0.035 | 2362 |
| 12 | 10 | 1.651 | 0.0661 | 3 | 0.032 | 1651 |
| 16 | 14 | 1.167 | 0.0469 | 3 | 0.025 | 1167 |
| 20 | 20 | 0.833 | 0.0331 | 5 | 0.0172 | 833 |
| 30 | 28 | 0.589 | 0.0232 | 5 | 0.0125 | 589 |
| 40 | 35 | 0.414 | 0.0165 | 5 | 0.0122 | 419 |
| 50 | 48 | 0.295 | 0.0117 | 5 | 0.0092 | 297 |
| 70 | 65 | 0.208 | 0.0083 | 5 | 0.0072 | 211 |
| 100 | 100 | 0.147 | 0.0059 | 6 | 0.0042 | 150 |
| 140 | 150 | 0.104 | 0.0041 | 6 | 0.0026 | 104 |
| 200 | 200 | 0.074 | 0.0029 | 7 | 0.0021 | 74 |
| 270 | 270 | 0.053 | 0.0021 | 7 | 0.0016 | 53 |

Currently, the sand particles of sand core compositions used in the manufacturing of cast parts typically focuses on the American Foundrymen's Society grain fineness number, or AFS/GFN. Known sand core compositions typically focus on an AFS/GFN of about 39.0 to about 45.0 according to the following expression:

AFS grain fineness number=Total product/Total percentage of retained grain

However, the present inventors have determined that focusing solely on the grain fineness number often results in inconsistent sand core compositions. This inconsistency in the mesh size or pan levels of a sand composition has been found to result in unstable and weak sand core quality.

Conversely, the sand grains of a sand core composition of the present invention have a specific weight percentage distribution across a specific range of grain sizes, while still maintaining a desired AFS/GFN (e.g., about 39.0 to about 42.0). In one such embodiment, at least about 40 weight percent of the sand has a particle (grain) size of about 296 microns to about 414 microns, and at least about 25 weight percent of the sand has a particle size of about 415 microns to about 589 microns. In another illustrative example, the sand core composition may comprise at least 75 weight percent of grains of about 296 microns to about 589 microns in size. In yet another illustrative example, the sand core composition may comprise at least about 45 weight percent of grains of about 296 to about 414 microns. In yet another illustrative example, the sand core composition may comprise at least about 93 weight percent of grains having a size of about 209 microns to about 589 microns. In yet another illustrative example, the sand core composition may comprise about 10 weight percent to about 25 weight percent of grains having a size of about 209 microns to about 295 microns.

In another embodiment, a sand core composition comprises sand having grains where at least about 95 weight percent of the grains are in a first size range that is within about 75 microns to about 589 microns, and where at least about 50 weight percent of the grains are in a second size range that spans about a 293 micron range within the first size range. The composition also comprises a binder. In a non-limiting example, the first particle size range is about 148 microns to about 589 microns, and the second particle size range is from about 296 microns to about 589 microns. In yet another non-limiting example, the first particle size range is about 105 microns to about 414 microns, and the second particle size range spans about 205 microns within the first particle size range (preferably about from 209 microns to about 414 microns). In yet another non-limiting example, the first particle size range is about 75 microns to about 295 microns, and the second particle size range spans about 147 microns within the first particle size range (preferably from about 148 microns to about 295 microns). In another non-limiting example, at least about 65 weight percent of the particles are in the second size range. In yet another non-limiting example, at least about 70 weight percent of the particles are in the second size range.

Another exemplary embodiment of a sand core composition of the present invention comprises about 0 to about 0.5 weight percent of 30 mesh size sand particles, about 28 to about 32 weight percent of 40 mesh size sand particles, about 40 to about 50 weight percent of 50 mesh size sand particles, about 17 to about 21 weight percent of 70 mesh size sand particles, about 4 to about 7.5 weight percent of 100 mesh size sand particles, about 0 to about 0.5 weight percent of 140 mesh size sand particles, and about 0 to about 0.2 weight percent of 200 mesh size sand particles. The above weight percentage ranges are shown in TABLE 2 below, along with other non-limiting properties of this exemplary sand core composition.

TABLE 2

| | |
|---|---|
| Melt Point | 208°-220° F. |
| Hot Tensile | 225-290 PSI |
| Cold Tensile | 300-375 PSI |
| L.O.I. | 1.1-1.7% |
| AFS/GFN | 39.0-42.0 |
| 30 Mesh Screen | 0-0.5% |
| 40 Mesh Screen | 28-32% |
| 50 Mesh Screen | 40-50% |
| 70 Mesh Screen | 17-21% |

TABLE 2-continued

| | |
|---|---|
| 100 Mesh Screen | 4-7.5% |
| 140 Mesh Screen | 0-0.5% |
| 200 Mesh Screen | 0-0.2% |

In another exemplary embodiment of casting sand core composition of the present invention, the sand particles include about 0 to about 0.5 weight percent of 30 mesh size sand particles, about 30 weight percent of 40 mesh size sand particles, about 45 weight percent of 50 mesh size sand particles, about 18 weight percent of 70 mesh size sand particles, about 4 to about 7 weight percent of 100 mesh size sand particles, about 0 to about 0.5 weight percent of 140 mesh size sand particles, and about 0 to about 0.2 weight percent of 200 mesh size sand particles.

As indicated by in TABLE 2, the size range and size distribution of the sand particles of a sand core composition of the present invention are controlled in order to achieve a stable, strong sand core. During testing, it was discovered that a sand core composition comprised primarily of sand grains from three consecutive mesh sizes results in a molded sand core of improved quality. The selected mesh sizes and the mesh size comprising the largest weight percentage of the composition may depend, for example, on the desired surface finish of a part cast using the sand core.

Figure 2:
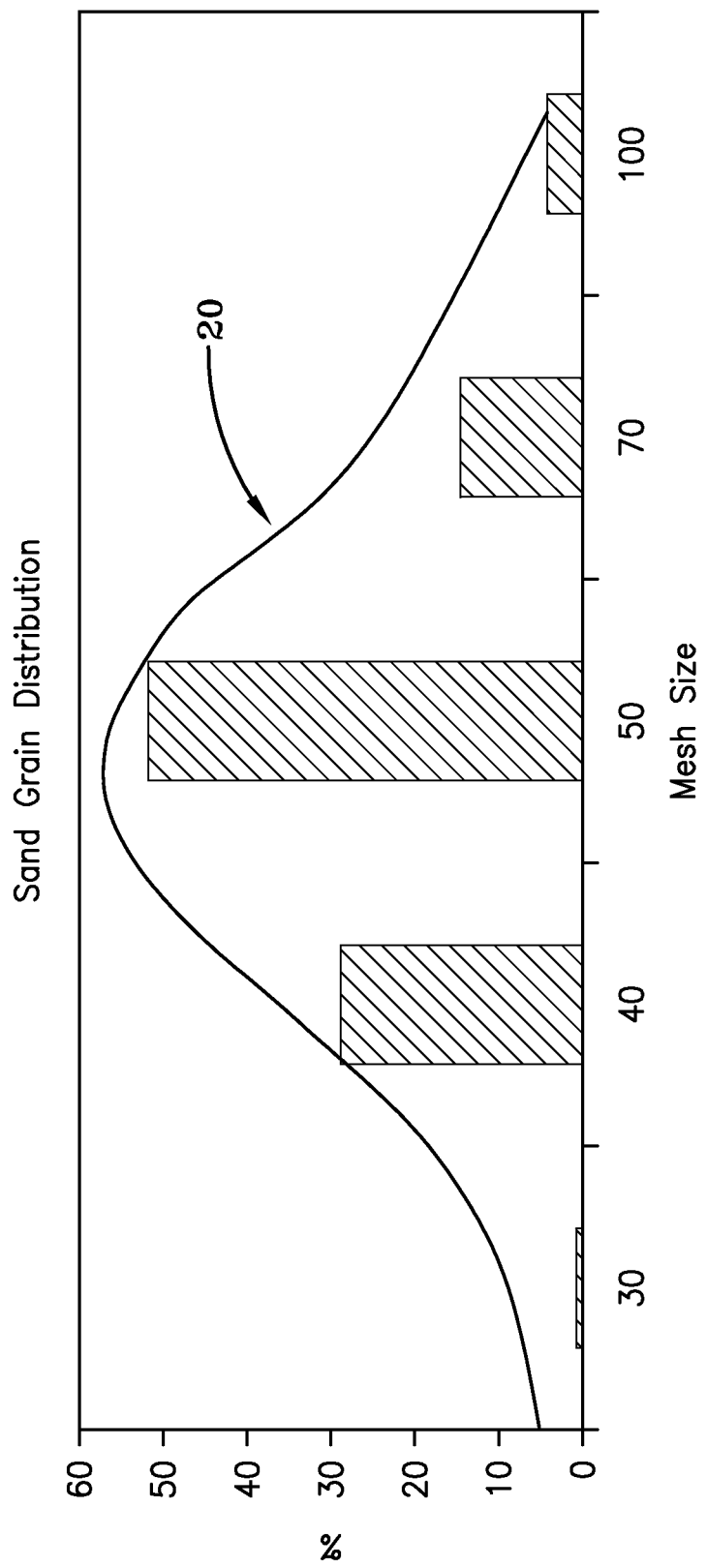
FIG. 2 is a graphical illustration of a particular sand particle distribution found in one exemplary embodiment of a casting sand core composition of the present invention.

An illustration of one such exemplary sand particle size distribution can be found in FIG. 2. FIG. 2 is a graphical representation of the sand particle size distribution of an exemplary sand core composition according to the present invention, wherein the x-axis represents various mesh sizes between 30 and 100 and the y-axis represents the weight percentage of sand particles (grains) of each mesh size present in the composition. In this case, it was determined that the three mesh sizes having the greatest impact on the properties of the resulting sand core were 40, 50 and 70 mesh. More specifically, it is desired that sand particles of approximately 50 mesh size be present in the highest weight percentage in this particular sand core composition. Therefore, as shown in FIG. 2, the weight percentage distribution of the various sizes of sand particles present in this sand core composition may be represented as a bell curve 20 having a peak at approximately 50 mesh.

It was discovered during experimentation with different sand core compositions that deviation from the a bell curve 20 distribution of sand particle sizes such as that illustrated in FIG. 2 results in compromised stability/strength of sand cores molded therefrom. A reason for this is believed to be that utilizing sand having a more even or differently concentrated distribution of particle sizes within a given particle size range allows the resulting composition to be too fine or too course. This may result in poor flowability of the sand core composition during the sand core molding process. It is believed that poor fluidity/flowability may also result in unstable sand cores having known defects such as mis-fills and binder degradation due to increased sill pressures.

Controlling the sand particle size range and the weight percent distribution of particles of sand core compositions of the present invention may result in improved fluidity/flowability. Further, a sand mixture comprising sand grains of both spherical and non-spherical shape may exhibit improved fluidity/flowability.

It has been determined through experimental use that sand cores made from a sand core composition according to the present invention have far less tendency to break or fracture during molding or during any phase of the casting process with which they are used. This decrease in fracturing also results in better quality sand cores. In turn, the higher quality sand cores result in more precise and consistent cast products.

While certain embodiments of the present invention are described in detail above. The scope of the invention is not to be considered limited by such disclosure, and modifications are possible without departing from the spirit of the invention as evidenced by the following claims:

What is claimed is:

1. A sand core composition, comprising:
   sand, said sand including grains of both substantially spherical and angular shape, said grains ranging in size from about 30 mesh to about 200 mesh and including:
   about 28 weight percent to about 32 weight percent of 40 mesh grains,
   about 40 weight percent to about 50 weight percent of 50 mesh grains,
   about 17 weight percent to about 21 weight percent of 70 mesh grains, and
   a binder material.

2. The sand core composition of claim 1, wherein silica sand grains make up about 40% to about 60% of said sand.

3. The sand core composition of claim 1, wherein lake sand grains make up about 40% to about 60% of said sand.

4. The sand core composition of claim 1, wherein said sand includes about 60% silica sand grains and about 40% lake sand grains.

5. The sand core composition of claim 1, wherein said sand further includes:
   about 0 weight percent to about 0.5 weight percent of 30 of mesh grains;
   about 4 weight percent to about 7.5 weight percent of 100 mesh grains;
   about 0 weight percent to about 0.5 weight percent of 140 mesh grains; and
   about 0 weight percent to about 0.2 weight percent of 200 mesh grains.

6. The sand core composition of claim 1, wherein silica sand grains are the sand grains of substantially spherical shape and lake sand grains are the sand grains of angular shape.

7. The sand core composition of claim 1, wherein said sand has a grain fineness number of about 39.0 to about 42.0.

8. A casting process sand core composition, comprising:
   a sand mixture, said sand mixture consisting essentially of silica sand and lake sand having grains ranging in size from about 30 mesh to about 200 mesh and present in a distribution of:
   about 0 weight percent to about 0.5 weight percent of 30 mesh grains,
   about 28 weight percent to about 32 weight percent of 40 mesh grains,
   about 40 weight percent to about 50 weight percent of 50 mesh grains,
   about 17 weight percent to about 21 weight percent of 70 mesh grains,
   about 4 weight percent to about 7.5 weight percent of 100 mesh grains;
   about 0 weight percent to about 0.5 weight percent of 140 mesh grains, and
   about 0 weight percent to about 0.2 weight percent of 200 mesh grains; and
   a binder material binding said sand grains together.

9. The casting process sand core composition of claim 8, wherein silica sand makes up about 40% to about 60% of said sand mixture.

10. The casting process sand core composition of claim 8, wherein said lake sand makes up about 40% to about 60% of said sand mixture.

11. The casting process sand core composition of claim 8, wherein said sand mixture includes about 60% silica sand and about 40% lake sand.

12. The casting process sand core composition of claim 8, wherein grains of said silica sand are substantially spherical in shape and grains of said lake sand are angular in shape.

13. A casting process sand core composition, comprising:
a sand mixture, said sand mixture including about 60% grains that are substantially spherical in shape and about 40% grains that are angular in shape, said sand mixture having a grain size range of between about 30 mesh and about 200 mesh and present in a distribution of:
about 0 weight percent to about 0.5 weight percent of 30 mesh grains,
about 28 weight percent to about 32 weight percent of 40 mesh grains,
about 40 weight percent to about 50 weight percent of 50 mesh grains,
about 17 weight percent to about 21 weight percent of 70 mesh grains,
about 4 weight percent to about 7.5 weight percent of 100 mesh grains;
about 0 weight percent to about 0.5 weight percent of 140 mesh grains, and
about 0 weight percent to about 0.2 weight percent of 200 mesh grains; and
a binder material binding said sand grains together.

14. The casting process sand core composition of claim 13, wherein said sand grains of substantially spherical shape are silica sand grains and said sand grains of angular shape are lake sand grains.

15. The casting process sand core composition of claim 14, wherein said sand mixture has a grain fineness number of about 39.0 to about 42.0.

16. A casting process sand core composition, comprising:
a sand mixture having a grain fineness number of between about 39.0 to about 42.0 and consisting essentially of lake sand and about 40% to about 60% silica sand, said sand mixture having a grain size range of between about 30 mesh to about 200 mesh and a grain size distribution within said grain size range that is representable by a bell curve that peaks at about 50 mesh; and
a binder material that binds said sand grains together.

17. The casting process sand core composition of claim 16, wherein said sand mixture includes about 60% silica sand and about 40% lake sand.

18. A casting process sand core composition, comprising:
a sand mixture having a grain fineness number of between about 39.0 to about 42.0 and consisting essentially of silica sand and about 40% to about 60% lake sand, said sand mixture having a grain size range of between about 30 mesh to about 200 mesh and a grain size distribution within said grain size range that is representable by a bell curve that peaks at about 50 mesh; and
a binder material that binds said sand grains together.

19. The casting process sand core composition of claim 18, wherein said sand mixture includes about 60% silica sand and about 40% lake sand.

* * * * *

UNITED STATES PATENT AND TRADEMARK OFFICE
CERTIFICATE OF CORRECTION

| | | |
|---|---|---|
| PATENT NO. | : 8,974,587 B2 | Page 1 of 1 |
| APPLICATION NO. | : 13/296103 | |
| DATED | : March 10, 2015 | |
| INVENTOR(S) | : Howell et al. | |

It is certified that error appears in the above-identified patent and that said Letters Patent is hereby corrected as shown below:

On the title page, item (75) Inventors:, please delete "Richard Niekamp, New Breman, OH (US)" and insert -- Richard Niekamp, New Bremen, OH (US) --.

Signed and Sealed this
Ninth Day of June, 2015

Michelle K. Lee
*Director of the United States Patent and Trademark Office*